(12) United States Patent
Mabuchi

(10) Patent No.: US 8,687,099 B2
(45) Date of Patent: Apr. 1, 2014

(54) IMAGING DEVICE, IMAGING METHOD, AND ELECTRONIC DEVICE

(75) Inventor: Keiji Mabuchi, Kanagawa (JP)

(73) Assignee: Sony Corporation (JP)

( * ) Notice: Subject to any disclaimer, the term of this patent is extended or adjusted under 35 U.S.C. 154(b) by 28 days.

(21) Appl. No.: 13/592,566

(22) Filed: Aug. 23, 2012

(65) Prior Publication Data

US 2013/0050554 A1 Feb. 28, 2013

(30) Foreign Application Priority Data

Aug. 31, 2011 (JP) .................................. 2011-188993

(51) Int. Cl.
 *H04N 3/14* (2006.01)
 *H04N 5/335* (2011.01)
 *C12Q 1/68* (2006.01)
 *H01J 40/00* (2006.01)
 *H01L 27/14* (2006.01)

(52) U.S. Cl.
 USPC ........... 348/302; 348/308; 348/300; 348/301; 250/200; 250/206; 257/428; 257/431

(58) Field of Classification Search
 USPC ........... 348/294–324; 250/200, 206; 257/414, 257/428, 431–466
 See application file for complete search history.

(56) References Cited

U.S. PATENT DOCUMENTS

| | | | | |
|---|---|---|---|---|
| 7,595,830 B2* | 9/2009 | Oita et al. | | 348/308 |
| 7,705,898 B2* | 4/2010 | Kuroda | | 348/296 |
| 7,714,918 B2* | 5/2010 | Kuroda | | 348/296 |
| 8,054,361 B2* | 11/2011 | Ang | | 348/308 |
| 8,199,237 B2* | 6/2012 | Yamagata et al. | | 348/308 |
| 8,363,133 B2* | 1/2013 | Hara | | 348/273 |
| 2003/0066966 A1* | 4/2003 | Wood | | 250/338.1 |
| 2003/0085862 A1* | 5/2003 | Tsutsui | | 345/90 |
| 2006/0108506 A1* | 5/2006 | Yang et al. | | 250/208.1 |
| 2006/0113458 A1* | 6/2006 | Yang et al. | | 250/208.1 |
| 2006/0221012 A1* | 10/2006 | Ikeda | | 345/76 |
| 2009/0046186 A1* | 2/2009 | Nagai | | 348/301 |
| 2009/0189881 A1* | 7/2009 | Ooishi et al. | | 345/211 |
| 2010/0103301 A1* | 4/2010 | Ang | | 348/308 |
| 2010/0253668 A1* | 10/2010 | Sugihara et al. | | 345/211 |
| 2011/0205213 A1* | 8/2011 | Mondori | | 345/211 |
| 2011/0242351 A1* | 10/2011 | Shoji | | 348/222.1 |

FOREIGN PATENT DOCUMENTS

JP 2009-505498 2/2005

* cited by examiner

*Primary Examiner* — Chia-Wei A Chen
(74) *Attorney, Agent, or Firm* — Sheridan Ross P.C.

(57) ABSTRACT

Disclosed herein is an imaging device including: a pixel unit including a pixel disposed in a plane and a driving unit. The pixel includes an accumulating section configured to detect a physical quantity, and accumulate a charge corresponding to the physical quantity, a transfer section configured to transfer the charge from the accumulating section, a converting section configured to convert the charge into a voltage, an output section configured to output a signal of the voltage converted by the converting section, a reset section configured to reset the potential of the converting section, and a connecting section connected to the converting section. The driving unit is configured to transfer a signal for giving an instruction to transfer the charge, and a connecting signal for controlling connection and non-connection. The driving unit makes the charge transferred in a state of the converting sections being connected to each other.

9 Claims, 10 Drawing Sheets

IMAGING DEVICE, IMAGING METHOD, AND ELECTRONIC DEVICE

BACKGROUND

The present technology relates to an imaging device, an imaging method, and an electronic device, and particularly to an imaging device, an imaging method, and an electronic device that can obtain a signal with an excellent S/N and with a wide dynamic range.

In related art, the PD (photodiode) of each pixel in a solid-state imaging device such as a CCD (Charge Coupled Device) or a CMOS (Complementary Metal Oxide Semiconductor) sensor generates a charge according to light received by the PD. Many solid-state imaging devices are configured such that the charge of a PD is transferred to an FD (Floating Diffusion) and the signal of a voltage corresponding to the charge generated in the PD is extracted by measuring the potential of the FD.

In such a solid-state imaging device, when the FD has a low capacitance, a gain at a time of conversion of the charge into the voltage by the FD is increased, and noise included in the signal output from the pixel is relatively reduced, thus resulting in a better S/N (signal-to-noise ratio) of an image signal. However, the FD of the low capacitance reduces an amount of charge that can be handled in the pixel, and narrows the dynamic range of the image signal, for example.

On the other hand, when the FD has a high capacitance, the amount of charge that can be handled in the pixel is increased, and for example the dynamic range of the image signal can be widened. However, the FD of the high capacitance decreases the gain at the time of conversion of the charge into the voltage by the FD, and the noise is also amplified when the image signal is amplified in a circuit in a subsequent stage, thus resulting in a degradation in S/N of the image signal.

There is accordingly a desire for a solid-state imaging device that can obtain an image signal with an excellent S/N and with a wide dynamic range. Japanese Patent Laid-Open No. 2009-505498 (hereinafter referred to as Patent Document 1), for example, proposes a solid-state imaging element in which an FD is formed by two capacitances, and a signal measured by one capacitance is used when there is a small amount of charge generated by a PD and a signal measured by the two capacitances is used when there is a large amount of charge generated by the PD.

SUMMARY

However, in the solid-state imaging element disclosed in Patent Document 1, the FD formed by the two capacitances has a large area, and the PD therefore has a small area, which results in decreases in sensitivity and amount of saturation charge of the PD. There is accordingly a desire for a solid-state imaging element that can obtain an image signal with an excellent S/N and with a wide dynamic range while an increase in area of the FD is avoided.

The present disclosure has been made in view of such a situation, and is to be able to obtain a signal with an excellent S/N and with a wide dynamic range. According to an embodiment of the present technology, there is provided an imaging device including: a pixel unit including a pixel disposed in a plane, the pixel including an accumulating section configured to detect a physical quantity, and accumulate a charge corresponding to the physical quantity, a transfer section configured to transfer the charge from the accumulating section, a converting section configured to convert the charge transferred from the accumulating section via the transfer section into a voltage corresponding to a potential generated by the charge, an output section configured to output a signal of the voltage converted by the converting section, a reset section configured to reset the potential of the converting section, and a connecting section connected to the converting section. The imaging device further includes a driving unit configured to output a transfer signal for giving an instruction to transfer the charge from the accumulating section of the pixel as an object of signal readout to the converting section, and a connecting signal for controlling connection and non-connection between the converting section of the pixel present in a row as an object of signal readout and a converting section of a pixel present in a row adjacent to the pixel present in the row as the object of signal readout. The driving unit makes the charge transferred according to the transfer signal in a state of the converting sections being connected to each other according to the connecting signal.

According to an embodiment of the present technology, there is provided an imaging method of an imaging device, the imaging device including a pixel unit including a pixel disposed in a plane, the pixel including an accumulating section configured to detect a physical quantity, and accumulate a charge corresponding to the physical quantity, a transfer section configured to transfer the charge from the accumulating section, a converting section configured to convert the charge transferred from the accumulating section via the transfer section into a voltage corresponding to a potential generated by the charge, an output section configured to output a signal of the voltage converted by the converting section, a reset section configured to reset the potential of the converting section, and a connecting section connected to the converting section. The imaging device further includes a driving unit configured to output a transfer signal for giving an instruction to transfer the charge from the accumulating section of the pixel as an object of signal readout to the converting section, and a connecting signal for controlling connection and non-connection between the converting section of the pixel present in a row as an object of signal readout and a converting section of a pixel present in a row adjacent to the pixel present in the row as the object of signal readout. The imaging method includes the driving unit making the charge transferred according to the transfer signal in a state of the converting sections being connected to each other according to the connecting signal.

An electronic device according to an embodiment of the present technology includes the imaging device described above.

In an embodiment of the present technology, a charge is transferred according to a transfer signal in a state of converting sections being connected to each other according to a connecting signal.

According to an embodiment of the present technology, it is possible to obtain a signal with an excellent S/N and with a wide dynamic range.

DETAILED DESCRIPTION OF THE PREFERRED EMBODIMENTS

Concrete embodiments to which the present technology is applied will be described in detail with reference to the drawings.

Figure 1:
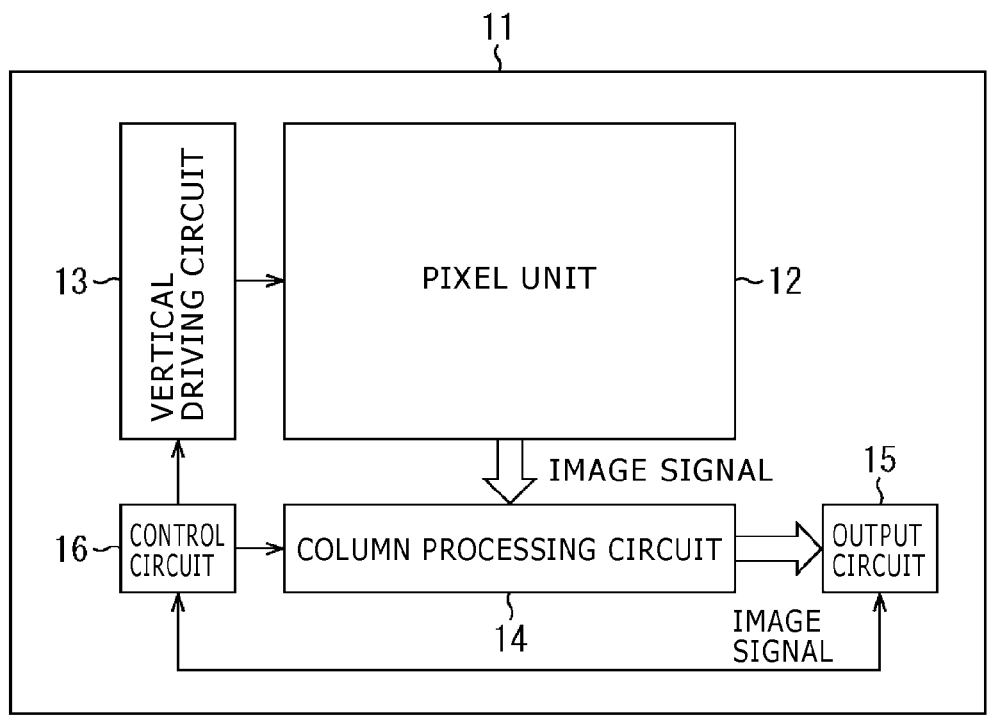
FIG. 1 is a block diagram showing an example of configuration of an embodiment of a solid-state imaging device to which the present technology is applied.

FIG. 1 is a block diagram showing an example of configuration of an embodiment of a solid-state imaging device to which the present technology is applied.

The solid-state imaging device 11 in FIG. 1 includes a pixel unit 12, a vertical driving circuit 13, a column processing circuit 14, an output circuit 15, and a control circuit 16.

The pixel unit 12 has a plurality of pixels (for example pixels 21 in FIG. 2 to be described later) arranged in the form of a matrix. The pixels each output the signal of a reset level and the signal of a level corresponding to an amount of incident light.

The vertical driving circuit 13 outputs driving signals (for example a selecting signal Sel, a reset signal Rst, a transfer signal Trf, and a connecting signal Cnt) so as to scan each row of the pixels possessed by the pixel unit 12, and thereby drives each of the pixels.

The column processing circuit 14 receives signals output from the respective pixels possessed by the pixel unit 12 in parallel. The column processing circuit 14 obtains an image signal by calculating a difference between the signal of a reset level and the signal of a level corresponding to an amount of incident light. The column processing circuit 14 then supplies the output circuit 15 with the image signal of a digital value obtained by subjecting the obtained image signal to A/D (analog/digital) conversion.

Figure 13:
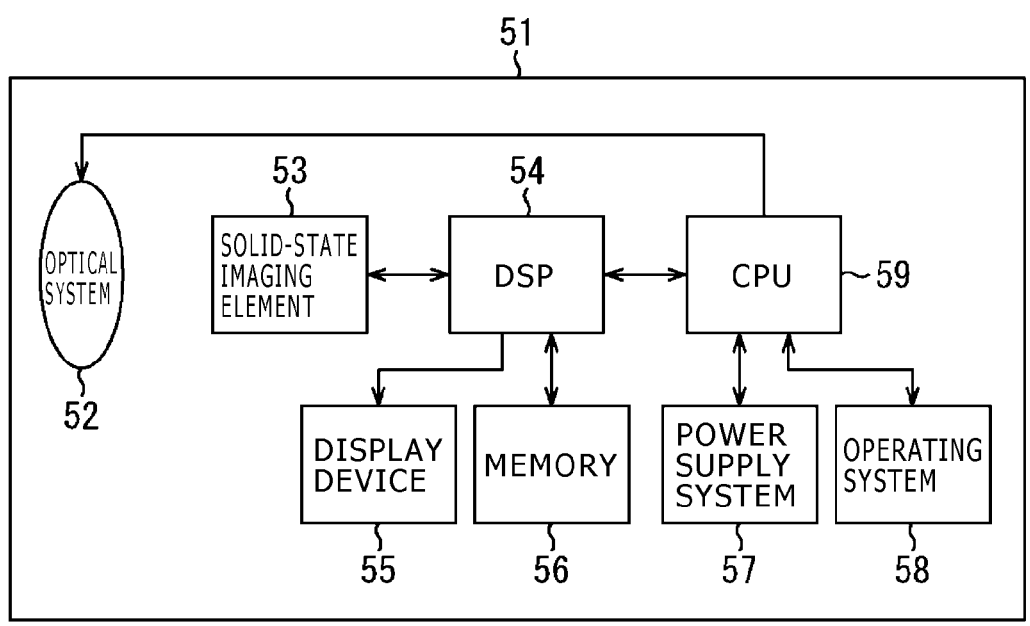
FIG. 13 is a block diagram showing an example of configuration of an imaging device included in an electronic device.

The output circuit 15 subjects the image signal supplied from the column processing circuit 14 to gain adjustment, flaw correction, and the like, and then supplies the image signal to an external circuit (for example a DSP (Digital Signal Processor) 54 in FIG. 13) in a subsequent stage not shown in FIG. 1.

The control circuit 16 transmits a control signal to each part forming the solid-state imaging device 11 to control the operation of the solid-state imaging device 11.

Figure 2:
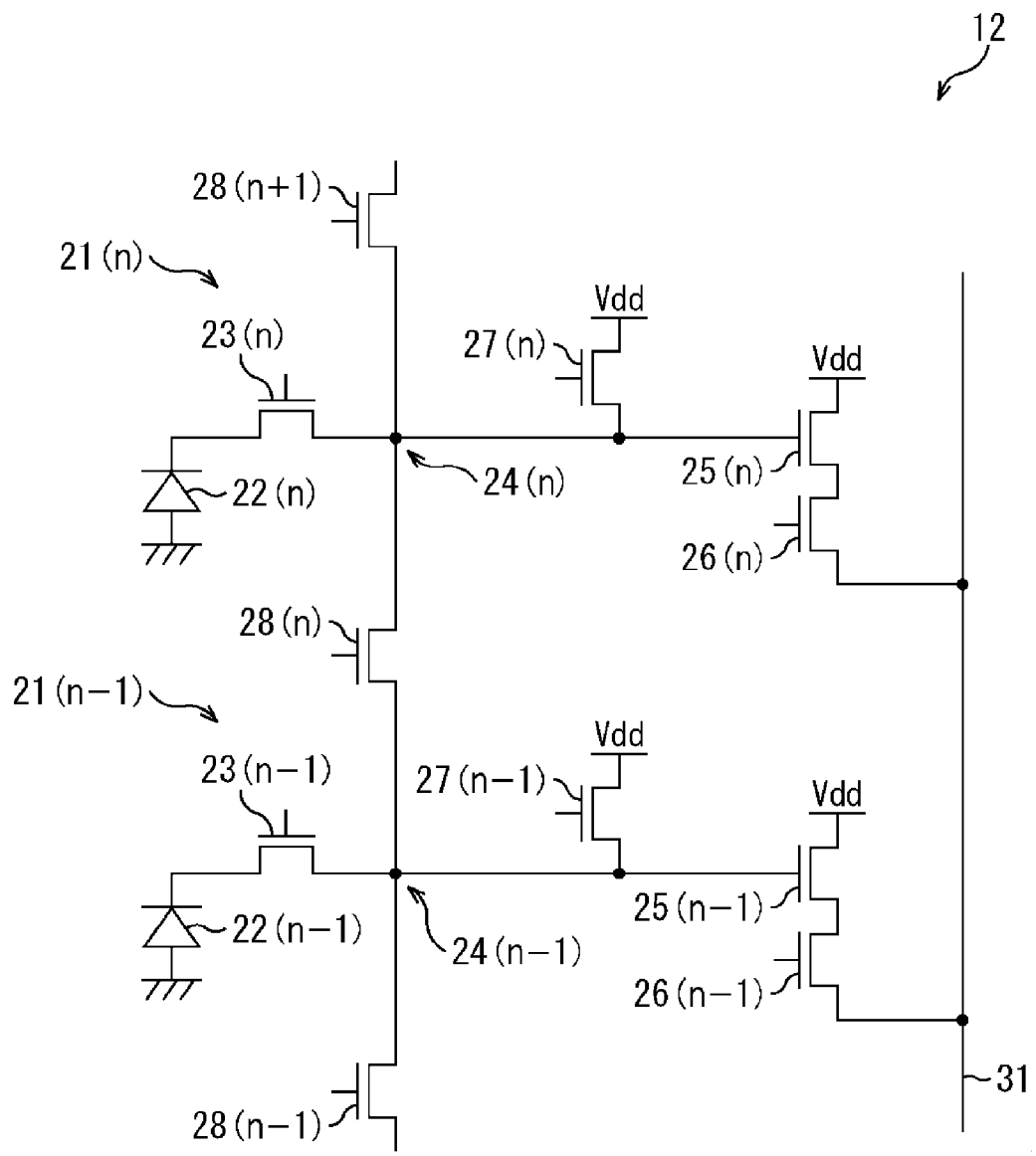
FIG. 2 is a circuit diagram showing a first example of configuration of a pixel unit.

FIG. 2 is a circuit diagram showing a first example of configuration of the pixel unit 12 in FIG. 1.

As shown in FIG. 2, pixels 21 of each column in the pixel unit 12 are connected to a vertical signal line 31 provided for each column. Signals output from pixels 21 are supplied to the column processing circuit 14 in FIG. 1 via the vertical signal line 31.

FIG. 2 shows a pixel 21($n$−1) in an (n−1)th row and a pixel 21($n$) in an nth row according to order of signal readout. Incidentally, the pixel 21($n$) and the pixel 21($n$−1) have a similar configuration, and the following description will be made of similar parts in the configuration of one pixel and description of similar parts in the configuration of the other pixel will be omitted.

The pixel 21($n$) includes a PD 22($n$), a transfer transistor 23($n$), an FD 24($n$), an amplifying transistor 25($n$), a selecting transistor 26($n$), a reset transistor 27($n$), and a connecting transistor 28($n$).

The PD 22($n$) has an anode grounded, and has a cathode connected to the source of the transfer transistor 23($n$). The PD 22($n$) is a photoelectric conversion element that generates a charge corresponding to an amount of light received (detects light), and which stores the charge. The transfer transistor 23($n$) has a gate connected to the vertical driving circuit 13 in FIG. 1 via a horizontal signal line (not shown), and has a source connected to the cathode of the PD 22($n$). The transfer transistor 23($n$) has a drain connected to the gate of the amplifying transistor 25($n$) and the source of the reset transistor 27($n$). A point of connection between the drain of the transfer transistor 23($n$) and the gate of the amplifying transistor 25($n$) forms the FD 24($n$). The transfer transistor 23($n$) transfers the charge generated in the PD 22($n$) to the FD 24($n$) according to a transfer signal Trf(n) supplied from the vertical driving circuit 13. The FD 24($n$) is in an electrically floating state. The FD 24($n$) receives the charge transferred from the PD 22($n$) via the transfer transistor 23($n$), and stores the charge. In addition, a gain at a time of conversion of the charge into a voltage by the FD 24($n$) is determined according to the capacitance of the FD 24($n$).

The amplifying transistor 25($n$) has the gate connected to the FD 24($n$), has a drain connected to a power supply voltage Vdd, and has a source connected to the drain of the selecting transistor 26($n$). The amplifying transistor 25($n$) outputs the signal of a level corresponding to the potential of the FD 24($n$). For example, when the FD 24($n$) is reset, the amplifying transistor 25($n$) outputs the signal of a reset level of the FD 24($n$). When a charge is transferred from the PD 22($n$) to the FD 24($n$), the amplifying transistor 25($n$) outputs the signal of a level corresponding to the potential of the FD 24($n$) which potential is produced by the charge, that is, a signal obtained by converting the charge into a voltage.

The selecting transistor 26($n$) has a gate connected to the vertical driving circuit 13 in FIG. 1 via a horizontal signal line (not shown), has a source connected to the column processing circuit 14 in FIG. 1 via the vertical signal line 31, and has the drain connected to the source of the amplifying transistor 25($n$). The selecting transistor 26($n$) connects the amplifying transistor 25($n$) to the vertical signal line 31 according to a selecting signal Sel(n) supplied from the vertical driving circuit 13. When the selecting transistor 26($n$) is on, the signal output from the amplifying transistor 25($n$) is supplied to the column processing circuit 14 via the vertical signal line 31.

The reset transistor 27($n$) has a gate connected to the vertical driving circuit 13 in FIG. 1 via a horizontal signal line (not shown), has the source connected to the FD 24($n$), and has a drain connected to the power supply voltage Vdd. The reset transistor 27($n$) resets the FD 24($n$) by discharging the charge accumulated in the FD 24($n$) to power supply wiring according to a reset signal Rst(n) supplied from the vertical driving circuit 13. The connecting transistor 28($n$) has a gate connected to the vertical driving circuit 13 in FIG. 1 via a horizontal signal line (not shown), has a source connected to the FD 24(n), and has a drain connected to the FD 24(n−1) of the pixel 21(n−1). The connecting transistor 28(n) connects the FD 24(n) and the FD 24(n−1) to each other according to a connecting signal Cnt(n) supplied from the vertical driving circuit 13.

That is, in the pixel unit 12, the FD 24(n) of the pixel 21(n) and the FD 24(n−1) of the pixel 21(n−1) can be connected to each other via the connecting transistor 28(n). The FD 24(n) of the pixel 21(n) can be similarly connected to an FD possessed by a pixel in an (n+1)th row not shown in FIG. 2 via the connecting transistor 28(n+1) of the pixel in the (n+1)th row. In addition, the FD 24(n−1) of the pixel 21(n−1) can be connected to an FD possessed by a pixel in an (n−2)th row not shown in FIG. 2 via a connecting transistor 28(n−1).

Incidentally, the capacitance of the PD 22(n) in the pixel unit 12 is designed to be higher than the capacitance of the FD 24(n) such that the amount of saturation charge of the PD 22(n) is about twice or more than twice the amount of charge that can be stored by the FD 24(n).

In the thus formed pixel unit 12, when the connecting transistor 28(n) is turned on according to the connecting signal Cnt(n), the FD 24(n) and the FD 24(n−1) are connected to each other to function as a floating diffusion of a high capacitance obtained by adding together the respective capacitances of the FD 24(n) and the FD 24(n−1). Thus, when the transfer transistor 23(n) is turned on while the FD 24(n) and the FD 24(n−1) are connected to each other, a charge is transferred from the PD 22(n) to the FD 24(n) and the FD 24(n−1). The amplifying transistor 25(n) then outputs a signal obtained by converting the charge stored in the FD 24(n) and the FD 24(n−1) into a voltage.

In this case, the solid-state imaging device 11 can switch between connection and non-connection of the FD 24(n) and the FD 24(n−1) according to the brightness of a subject as an object of imaging. For example, when the subject is brighter than a predetermined brightness, imaging is performed with the FD 24(n) and the FD 24(n−1) connected to each other. When the subject is darker than the predetermined brightness, imaging is performed without the FD 24(n) and the FD 24(n−1) connected to each other.

Incidentally, in the solid-state imaging device 11, the output circuit 15 determines the brightness of the subject on the basis of an image signal obtained from the signal output by the pixel unit 12, and notifies a result of the determination to the control circuit 16. The control circuit 16 then controls the vertical driving circuit 13 as to whether or not to connect the FD 24(n) and the FD 24(n−1) to each other.

A first example of driving in which the signal of the pixel 21(n) is read out in the solid-state imaging device 11 having the pixel unit 12 in FIG. 2 will next be described with reference to FIGS. 3A and 3B.

Figure 3A:
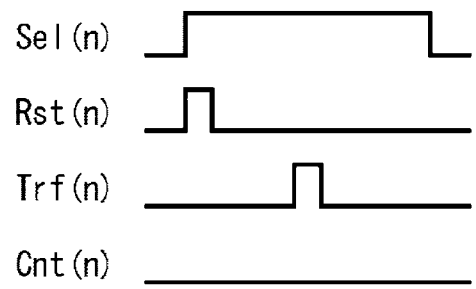
FIGS. 3A and 3B are diagrams showing the driving timing of a first example of driving in which the signal of a pixel is read out.

FIG. 3A shows driving timing when the signal of the pixel 21(n) is read out in a case of a dark subject. FIG. 3B shows driving timing when the signal of the pixel 21(n) is read out in a case of a bright subject.

As shown in FIG. 3A, in the case of the dark subject, driving is performed while the connecting signal Cnt(n) remains off.

First, when timing of starting the readout of the signal of the pixel 21(n) arrives, the vertical driving circuit 13 turns on the selecting signal Sel(n). Thereby, the amplifying transistor 25(n) is connected to the vertical signal line 31 via the selecting transistor 26(n), and the amplifying transistor 25(n) starts outputting a signal corresponding to the potential of the FD 24(n). Next, the vertical driving circuit 13 resets the FD 24(n) by outputting a reset pulse for turning on the reset signal Rst(n). After the FD 24(n) is reset, the column processing circuit 14 captures the signal output to the vertical signal line 31 by the amplifying transistor 25(n) as the signal of a reset level.

The vertical driving circuit 13 thereafter outputs a transfer pulse for turning on the transfer signal Trf(n). A charge generated in the PD 22(n) is thereby transferred to the FD 24(n) via the transfer transistor 23(n). After the charge is transferred from the PD 22(n) to the FD 24(n), a signal output to the vertical signal line 31 by the amplifying transistor 25(n), that is, the signal of a level corresponding to the potential of the FD 24(n) after the transfer of the charge is captured by the column processing circuit 14. The column processing circuit 14 obtains the image signal of a voltage corresponding to the charge transferred from the PD 22(n) to the FD 24(n) by calculating a difference between the signal of the reset level and the signal of the level corresponding to the potential of the FD 24(n) after the transfer of the charge.

Then, when timing of ending the readout of the signal of the pixel 21(n) arrives, the vertical driving circuit 13 turns off the selecting signal Sel(n).

Thus, in the case of the dark subject, the charge transferred from the PD 22(n) is handled by the capacitance of only the FD 24(n) (that is, a lower capacitance than the capacitance obtained by adding together the respective capacitances of the FD 24(n) and the FD 24(n−1)). As described above, in a case of the low capacitance of the FD, the gain at the time of conversion of the charge into a voltage by the FD is increased. It can therefore be said that imaging is performed with a high gain in the case of the dark subject.

Then, after the signal of the pixel 21(n) is read out, the signal of a pixel 21(n+1) is similarly read out, and the readout of a signal is continued for a pixel in a next row. Incidentally, a charge remaining in the PD 22(n) after the PD 22(n) transferred the charge to the FD 24(n) is reset by an electronic shutter operation after the readout of the signal.

Figure 3B:
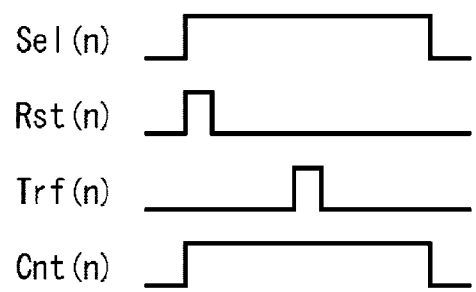

On the other hand, as shown in FIG. 3B, in the case of the bright subject, the connecting signal Cnt(n) is on during substantially the same period as a period during which the selecting signal Sel(n) is on.

First, when timing of starting the readout of the signal of the pixel 21(n) arrives, the vertical driving circuit 13 turns on the selecting signal Sel(n) and the connecting signal Cnt(n). Thereby, the FD 24(n) and the FD 24(n−1) are connected to each other via the connecting transistor 28(n). Thus, in this case, the amplifying transistor 25(n) starts outputting a signal corresponding to the potential of the capacitance obtained by adding together the capacitance of the FD 24(n) and the capacitance of the FD 24(n−1).

The vertical driving circuit 13 next resets the FD 24(n) and the FD 24(n−1) by outputting a reset pulse for turning on the reset signal Rst(n). After the FD 24(n) and the FD 24(n−1) are reset, the column processing circuit 14 captures the signal output to the vertical signal line 31 by the amplifying transistor 25(n) as the signal of a reset level.

The vertical driving circuit 13 thereafter outputs a transfer pulse for turning on the transfer signal Trf(n). A charge generated in the PD 22(n) is thereby transferred to the FD 24(n) and the FD 24(n−1) via the transfer transistor 23(n). Thus, the charge generated in the PD 22(n) is stored by the capacitance obtained by adding together the capacitance of the FD 24(n) and the capacitance of the FD 24(n−1).

After the charge is transferred from the PD 22(n) to the FD 24(n) and the FD 24(n−1), a signal output to the vertical signal line 31 by the amplifying transistor 25(n), that is, the signal of a level corresponding to the potential of the FD 24(n) and the FD 24(n−1) after the transfer of the charge is captured by the column processing circuit 14. The column processing circuit 14 obtains the image signal of a voltage corresponding to the charge transferred from the PD 22(n) to the FD 24(n) and the FD 24(n−1) by calculating a difference between the signal of the reset level and the signal of the level corresponding to the potential of the FD 24(n) and the FD 24(n−1) after the transfer of the charge.

Then, when timing of ending the readout of the signal of the pixel 21(n) arrives, the vertical driving circuit 13 turns off the selecting signal Sel(n) and the connecting signal Cnt(n).

Thus, in the case of the bright subject, the charge transferred from the PD 22(n) is handled by the capacitance obtained by adding together the capacitance of the FD 24(n) and the capacitance of the FD 24(n−1) (that is, a higher capacitance than the capacitance of only the FD 24(n)). As described above, in a case of the high capacitance of the FDs, the gain at the time of conversion of the charge into a voltage by the FDs is decreased. It can therefore be said that imaging is performed with a low gain in the case of the bright subject.

As described above, according to the brightness of a subject as an object of imaging, the solid-state imaging device 11 performs imaging with the FD 24(n) and the FD 24(n−1) disconnected from each other in a case of a dark subject, and performs imaging with the FD 24(n) and the FD 24(n−1) connected to each other in a case of a bright subject.

Thus, for example, in a case of a dark subject, the gain at the time of conversion of a charge into a voltage in the FD 24(n) can be increased, and the S/N of the image signal can be increased. That is, when the gain at the time of conversion of a charge into a voltage is low, the image signal needs to be amplified in the column processing circuit 14 in a subsequent stage. At this time, noise caused by the selecting transistor 26(n) is amplified. On the other hand, a high gain at the time of conversion of a charge into a voltage can suppress an adverse effect of amplifying the noise by the circuit in the subsequent stage. Thus, in a case of a dark subject, the S/N of the image signal output from the solid-state imaging device 11 is improved. Further, in this case, the power consumption of the column processing circuit 14 can be reduced.

On the other hand, for example, in a case of a bright subject, a charge transferred from the PD 22(n) can be handled by the high capacitance of the FD 24(n) and the FD 24(n−1) connected to each other, so that the number of saturation electrons is increased, and a brighter image can be taken. That is, the dynamic range of the image signal can be widened.

Thus, the solid-state imaging device 11 can obtain an image signal with an excellent S/N at low illuminance and with a wide dynamic range. Further, the FD is not formed by two capacitances unlike the solid-state imaging element according to the foregoing Patent Document 1, so that an increase in area of the FD can be avoided. Thus, decreases in sensitivity and amount of saturation charge of the PD can be prevented. In addition, in this driving example, a reset level is read out first, and a level after the transfer of a charge is read out later, so that the charge transferred from the PD 22(n) can be obtained more accurately.

In this case, as for the reset transistor 27(n), a raised voltage is desirably used to apply a high level to the gate of the reset transistor 27(n) so that the FD 24(n) can be reset to the power supply voltage Vdd. In addition, a depletion type may be adopted as the reset transistor 27(n).

In addition, as for the connecting transistor 28(n), a raised voltage is desirably used to apply a high level to the gate of the connecting transistor 28(n) so that the FD 24(n) and the FD 24(n−1) conduct even with the power supply voltage Vdd. In addition, a depletion type may be adopted as the connecting transistor 28(n).

Incidentally, description has been made of an example in which the two FDs 24(n) and 24(n−1) are connected to each other via the connecting transistor 28(n). However, three or more FDs 24 may be connected to each other according to an amount of saturation charge of the PD 22(n). For example, when the amount of saturation charge of the PD 22(n) is about three times the amount of charge that can be stored by the FD 24(n), the FD possessed by the pixel in the (n−2)th row not shown in the figures may be further connected via the connecting transistor 28(n−1). In this case, the charge transferred from the PD 22(n) is stored at the FDs possessed by the PD 22(n), a PD 22(n−1), and the pixel in the (n−2)th row.

Further, the charge transferred from the PD 22(n) may be stored by a combination of the FD 24(n) and the FD possessed by the pixel in the (n+1)th row not shown in the figures with the FD 24(n) and the FD possessed by the pixel in the (n+1)th row connected to each other via the connecting transistor 28(n+1). However, it is assumed that when a charge stored at the FD of the pixel in the (n+1)th row in which a charge is read out next to the PD 22(n) exceeds an amount of saturation charge, a charge overflows from the PD of the pixel in the (n+1)th row to the FD. If the charge overflows from the PD of the pixel in the (n+1)th row, the charge generated by the PD of the pixel in the (n+1)th row cannot be read out accurately with the combination of the FD 24(n) and the FD of the pixel in the (n+1)th row.

On the other hand, the charge of the PD 22(n−1) is read out immediately before the PD 22(n) and thus the PD 22(n−1) is immediately after being emptied. There is thus a small possibility of a charge overflowing from the PD 22(n−1) when a charge generated in the PD 22(n) is read by the combination of the FD 24(n) and the FD 24(n−1). That is, when the combination of the FD 24(n) and the FD 24(n−1) is adopted, the charge generated in the PD 22(n) can be read more accurately than when the combination of the FD 24(n) and the FD of the pixel in the (n+1)th row is adopted.

Incidentally, the timing of turning on the connecting signal Cnt(n) as shown in FIG. 3B may not be the same as the timing of turning on the selecting signal Sel(n). It suffices for the connecting signal Cnt(n) to be on at least by the timing of turning off the reset pulse for turning on the reset signal Rst(n). In addition, the timing of turning off the connecting signal Cnt(n) may not be the same as the timing of turning off the selecting signal Sel(n). It suffices for the connecting signal Cnt(n) to be off before affecting a next process of reading out a signal.

A second example of driving in which the signal of the pixel 21(n) is read out in the solid-state imaging device 11 having the pixel unit 12 in FIG. 2 will next be described with reference to FIG. 4.

First, when timing of starting the readout of the signal of the pixel 21(n) arrives, the vertical driving circuit 13 turns on the selecting signal Sel(n). Thereby, the amplifying transistor 25(n) is connected to the vertical signal line 31 via the selecting transistor 26(n), and the amplifying transistor 25(n) starts outputting a signal corresponding to the potential of the FD 24(n). Next, the vertical driving circuit 13 resets the FD 24(n) by outputting a first reset pulse for turning on the reset signal Rst(n). After the FD 24(n) is reset, the column processing circuit 14 captures the signal output to the vertical signal line 31 by the amplifying transistor 25(n) as the signal of a first reset level. The vertical driving circuit 13 thereafter outputs a first transfer pulse for turning on the transfer signal Trf(n). A charge generated in the PD 22(n) is thereby transferred to the FD 24(n) via the transfer transistor 23(n). At this time, when there is a large amount of light and a large amount of charge is accumulated in the PD 22(*n*), a charge remains in the PD 22(*n*) according to the capacitance of the FD 24(*n*).

After the charge is transferred from the PD 22(*n*) to the FD 24(*n*), the signal of a level corresponding to the potential of the FD 24(*n*) after the transfer of the charge is captured by the column processing circuit 14. The column processing circuit 14 obtains the image signal of a voltage corresponding to the charge transferred from the PD 22(*n*) to the FD 24(*n*) by calculating a difference between the signal of the first reset level and the signal of the level corresponding to the potential of the FD 24(*n*) after the transfer of the charge. This image signal corresponds to the charge converted into a voltage by the capacitance of only the FD 24(*n*) (low capacitance), and is thus an image signal obtained by imaging a part of low illuminance with a high gain (hereinafter referred to as a low-illuminance signal as appropriate). The low-illuminance signal is a low-noise image signal because of the high gain at the time of conversion of the charge into the voltage.

Then, the vertical driving circuit 13 turns on the connecting signal Cnt(n). The FD 24(*n*) and the FD 24(*n*−1) are thereby connected to each other via the connecting transistor 28(*n*). Thus, in this case, the amplifying transistor 25(*n*) starts outputting a signal corresponding to the potential of the high capacitance obtained by adding together the capacitance of the FD 24(*n*) and the capacitance of the FD 24(*n*−1).

Next, the vertical driving circuit 13 resets the FD 24(*n*) and the FD 24(*n*−1) by outputting a second reset pulse for turning on the reset signal Rst(n). After the FD 24(*n*) and the FD 24(*n*−1) are reset, the column processing circuit 14 captures the signal output to the vertical signal line 31 by the amplifying transistor 25(*n*) as the signal of a second reset level.

The vertical driving circuit 13 thereafter outputs a second transfer pulse for turning on the transfer signal Trf(n). At this time, the charge remaining in the PD 22(*n*) at the time of the transfer of the charge according to the first transfer pulse is transferred to the FD 24(*n*) and the FD 24(*n*−1) via the transfer transistor 23(*n*). That is, when there is a large amount of light and a charge remains in the PD 22(*n*) at the time of the transfer of the charge according to the first transfer pulse, the charge is transferred from the PD 22(*n*) to the FD 24(*n*) and the FD 24(*n*−1).

The column processing circuit 14 calculates a difference between the signal of the second reset level and the signal of a level corresponding to a potential after the charge is transferred from the PD 22(*n*) to the FD 24(*n*) and the FD 24(*n*−1) according to the second transfer pulse. The column processing circuit 14 thereby obtains an image signal corresponding to the charge remaining in the PD 22(*n*) at the time of the transfer of the charge according to the first transfer pulse. This image signal corresponds to the charge converted into a voltage by the high capacitance of the FD 24(*n*) and the capacitance of the FD 24(*n*−1) connected to each other, and is thus an image signal obtained by imaging a part of high illuminance with a low gain (hereinafter referred to as a high-illuminance signal as appropriate). The high-illuminance signal corresponds to the charge converted into the voltage by the high capacitance, and is thus an image signal with a wide dynamic range.

Then, when timing of ending the readout of the signal of the pixel 21(*n*) arrives, the vertical driving circuit 13 turns off the selecting signal Sel(n) and the connecting signal Cnt(n).

Thus, in the second example of driving in which the signal of the pixel 21(*n*) is read out, the column processing circuit 14 obtains two image signals, that is, the low-illuminance signal and the high-illuminance signal, and outputs the two image signals to the output circuit 15. For example, when the low-illuminance signal is less than a predetermined specified value, the output circuit 15 outputs the low-illuminance signal as an image signal. On the other hand, when the low-illuminance signal is equal to or more than the predetermined specified value, the output circuit 15 makes the gain of the low-illuminance signal the same as that of the high-illuminance signal, thereafter adds together the low-illuminance signal and the high-illuminance signal, and outputs the result as the image signal of a voltage corresponding to the total charge generated in the PD 22(*n*).

The solid-state imaging device 11 can thereby obtain an image signal with an excellent S/N at low illuminance and with a wide dynamic range.

Figure 5:
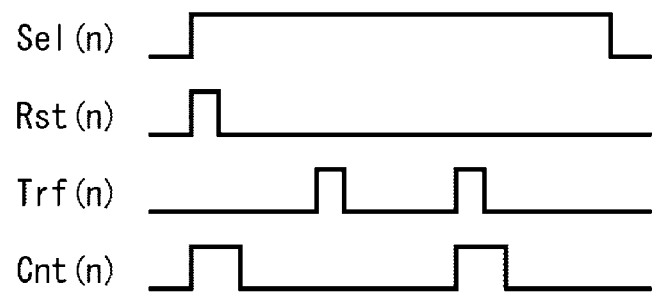
FIG. 5 is a diagram showing the driving timing of a third example of driving in which the signal of a pixel is read out.

A third example of driving in which the signal of the pixel 21(*n*) is read out in the solid-state imaging device 11 having the pixel unit 12 in FIG. 2 will next be described with reference to FIG. 5.

First, when timing of starting the readout of the signal of the pixel 21(*n*) arrives, the vertical driving circuit 13 turns on the selecting signal Sel(n) and the connecting signal Cnt(n). Thereby, the FD 24(*n*) and the FD 24(*n*−1) are connected to each other via the connecting transistor 28(*n*). Thus, in this case, the amplifying transistor 25(*n*) starts outputting a signal corresponding to the potential of the high capacitance obtained by adding together the capacitance of the FD 24(*n*) and the capacitance of the FD 24(*n*−1).

The vertical driving circuit 13 next resets the FD 24(*n*) and the FD 24(*n*−1) by outputting a reset pulse for turning on the reset signal Rst(n) in a state of the connecting signal Cnt(n) being on. After the FD 24(*n*) and the FD 24(*n*−1) are reset, the column processing circuit 14 captures the signal output to the vertical signal line 31 by the amplifying transistor 25(*n*) as the signal of a reset level.

After the column processing circuit 14 captures the signal of the reset level, the vertical driving circuit 13 turns off the connecting signal Cnt(n).

The vertical driving circuit 13 thereafter outputs a first transfer pulse for turning on the transfer signal Trf(n). A charge generated in the PD 22(*n*) is thereby transferred to the FD 24(*n*) via the transfer transistor 23(*n*). At this time, when there is a large amount of light and a large amount of charge is accumulated in the PD 22(*n*), a charge remains in the PD 22(*n*) according to the capacitance of the FD 24(*n*).

After the charge is transferred from the PD 22(*n*) to the FD 24(*n*), the signal of a level corresponding to the potential of the FD 24(*n*) after the transfer of the charge is captured by the column processing circuit 14. The column processing circuit 14 obtains a low-illuminance signal as an image signal obtained by imaging a part of low illuminance with a high gain by calculating a difference between the signal of the reset level and the signal of the level corresponding to the potential of the FD 24(*n*) after the transfer of the charge.

The vertical driving circuit 13 thereafter outputs a second transfer pulse for turning on the transfer signal Trf(n) in a state of the FD 24(*n*) and the FD 24(*n*−1) being connected to each other with the connecting signal Cnt(n) turned on. Thereby, the charge remaining in the PD 22(*n*) at the time of the transfer of the charge according to the first transfer pulse is transferred to the FD 24(*n*) and the FD 24(*n*−1) via the transfer transistor 23(*n*). At this time, the charge transferred to the FD 24(*n*) at the time of the transfer of the charge according to the first transfer pulse and the charge transferred to the FD 24(*n*) and the FD 24(*n*−1) at the time of the transfer of the charge according to the second transfer pulse are added together, and stored at the FD 24(*n*) and the FD 24(*n*−1). That is, the total charge generated in the PD 22(*n*) is stored in a state of being distributed to the FD 24(*n*) and the FD 24(*n*−1). The vertical driving circuit 13 thereafter turns off the connecting signal Cnt(n). The FD 24(*n*) stores half of the total charge generated in the PD 22(*n*). That is, a gain when the FD 24(*n*) converts the charge generated in the PD 22(*n*) into a voltage effectively becomes ½. The column processing circuit 14 captures the signal of a level corresponding to the potential of the FD 24(*n*) according to a charge as half of the total charge generated in the PD 22(*n*), and calculates a difference between the signal and the signal of the reset level. The column processing circuit 14 thereby obtains a high-illuminance signal as an image signal obtained by imaging a part of high illuminance with a low gain.

Then, when timing of ending the readout of the signal of the pixel 21(*n*) arrives, the vertical driving circuit 13 turns off the selecting signal Sel(n).

Thus, in the third example of driving in which the signal of the pixel 21(*n*) is read out, the column processing circuit 14 obtains two image signals, that is, the low-illuminance signal and the high-illuminance signal, and outputs the two image signals to the output circuit 15. For example, when the low-illuminance signal is less than a predetermined specified value, the output circuit 15 outputs the low-illuminance signal as an image signal. On the other hand, when the low-illuminance signal is equal to or more than the predetermined specified value, the output circuit 15 outputs the high-illuminance signal as an image signal.

In the third driving example, the charge transferred to the FD 24(*n*) according to the first transfer pulse and the charge transferred to the FD 24(*n*) and the FD 24(*n*−1) according to the second transfer pulse are added together at the time of the transfer of the charge according to the second transfer pulse. Thus, in the third driving example, unlike the second driving example, the low-illuminance signal and the high-illuminance signal are not added together. In addition, because the high-illuminance signal is the signal of the level corresponding to the charge as half of the total charge generated in the PD 22(*n*), the high-illuminance signal is output after being amplified twofold in the output circuit 15.

The solid-state imaging device 11 can thereby obtain an image signal with an excellent S/N at low illuminance and with a wide dynamic range.

Figure 6:
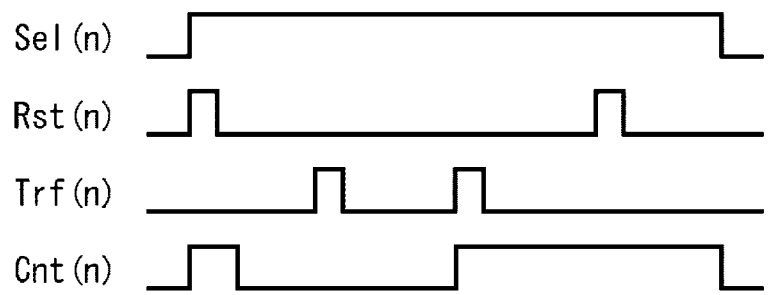
FIG. 6 is a diagram showing the driving timing of a fourth example of driving in which the signal of a pixel is read out.

A fourth example of driving in which the signal of the pixel 21(*n*) is read out in the solid-state imaging device 11 having the pixel unit 12 in FIG. 2 will next be described with reference to FIG. 6.

In the fourth driving example, as in the third driving example described with reference to FIG. 5, the selecting signal Sel(n) and the connecting signal Cnt(n) are turned on, and the reset signal Rst(n) is turned on in the state of the connecting signal Cnt(n) being on. Thereafter, the connecting signal Cnt(n) is turned off, and a first transfer pulse for turning on the transfer signal Trf(n) is output. The column processing circuit 14 thereby obtains a low-illuminance signal.

Then, the vertical driving circuit 13 turns on the connecting signal Cnt(n) again, so that the FD 24(*n*) and the FD 24(*n*−1) are connected to each other via the connecting transistor 28(*n*), and thereafter outputs a second transfer pulse for turning on the transfer signal Trf(n). A charge remaining in the PD 22(*n*) at the time of transfer of a charge according to the first transfer pulse is thereby transferred to the FD 24(*n*) and the FD 24(*n*−1) via the transfer transistor 23(*n*).

At this time, the charge transferred to the FD 24(*n*) at the time of the transfer of the charge according to the first transfer pulse and the charge transferred to the FD 24(*n*) and the FD 24(*n*−1) at the time of the transfer of the charge according to the second transfer pulse are added together, and stored at the FD 24(*n*) and the FD 24(*n*−1). Then, the signal of a level corresponding to a potential after the charge is transferred from the PD 22(*n*) to the FD 24(*n*) and the FD 24(*n*−1) is output from the amplifying transistor 25(*n*), and captured by the column processing circuit 14.

Thereafter, the vertical driving circuit 13 outputs a second reset pulse for turning on the reset signal Rst(n) with the connecting signal Cnt(n) remaining on, that is, with the FD 24(*n*) and the FD 24(*n*−1) connected to each other. Thereby, the FD 24(*n*) and the FD 24(*n*−1) are reset, and the column processing circuit 14 captures the signal output to the vertical signal line 31 by the amplifying transistor 25(*n*) as the signal of a second reset level. The signal of the second reset level indicates a reset level in the state of the FD 24(*n*) and the FD 24(*n*−1) being connected to each other.

The column processing circuit 14 calculates a difference between the signal of the second reset level and the signal of the level corresponding to the potential after the charge is transferred from the PD 22(*n*) to the FD 24(*n*) and the FD 24(*n*−1) according to the second transfer pulse. The column processing circuit 14 thereby obtains a high-illuminance signal as an image signal obtained by imaging a part of high illuminance with a low gain.

Then, when timing of ending the readout of the signal of the pixel 21(*n*) arrives, the vertical driving circuit 13 turns off the selecting signal Sel(n) and the connecting signal Cnt(n).

Thus, in the fourth example of driving in which the signal of the pixel 21(*n*) is read out, the column processing circuit 14 obtains two image signals, that is, the low-illuminance signal and the high-illuminance signal, and outputs the two image signals to the output circuit 15. For example, when the low-illuminance signal is less than a predetermined specified value, the output circuit 15 outputs the low-illuminance signal as an image signal. On the other hand, when the low-illuminance signal is equal to or more than the predetermined specified value, the output circuit 15 outputs the high-illuminance signal as an image signal.

The solid-state imaging device 11 can thereby obtain an image signal with an excellent S/N at low illuminance and with a wide dynamic range.

Incidentally, unlike the third driving example, the fourth driving example can eliminate an effect of distribution noise caused by channel charge distribution when the connecting transistor 28 is turned off on the high-illuminance signal. However, in the fourth driving example, the high-illuminance signal is affected by reset noise caused by reset operation according to the second reset pulse.

Figure 7:
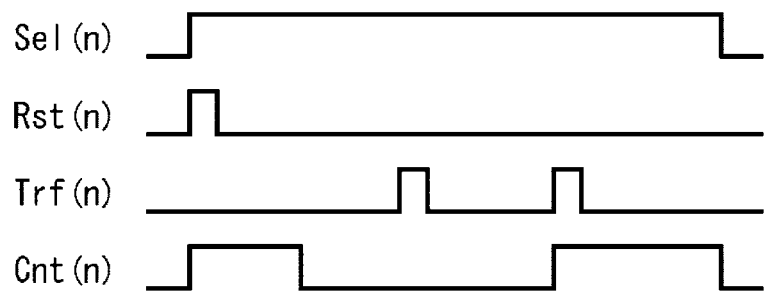
FIG. 7 is a diagram showing the driving timing of a fifth example of driving in which the signal of a pixel is read out.

A fifth example of driving in which the signal of the pixel 21(*n*) is read out in the solid-state imaging device 11 having the pixel unit 12 in FIG. 2 will next be described with reference to FIG. 7.

First, when timing of starting the readout of the signal of the pixel 21(*n*) arrives, the vertical driving circuit 13 turns on the selecting signal Sel(n) and the connecting signal Cnt(n). Thereby, the amplifying transistor 25(*n*) is connected to the vertical signal line 31 via the selecting transistor 26(*n*), and the amplifying transistor 25(*n*) starts outputting a signal corresponding to the potential of the FD 24(*n*) and the FD 24(*n*−1).

The vertical driving circuit 13 next resets the FD 24(*n*) and the FD 24(*n*−1) by outputting a reset pulse for turning on the reset signal Rst(n) in a state of the connecting signal Cnt(n) being on. After the FD 24(*n*) and the FD 24(*n*−1) are reset, the column processing circuit 14 captures the signal output to the vertical signal line 31 by the amplifying transistor 25(*n*) as the signal of a first reset level. The signal of the first reset level indicates a reset level in a state of the FD 24(*n*) and the FD 24(*n*−1) being connected to each other. After the column processing circuit 14 captures the signal of the first reset level, the vertical driving circuit 13 turns off the connecting signal Cnt(n). The column processing circuit 14 captures a signal corresponding to the potential of the FD 24(n) as the signal of a second reset level. The signal of the second reset level indicates the reset level of the FD 24(n) disconnected from the FD 24(n−1).

The vertical driving circuit 13 thereafter outputs a first transfer pulse for turning on the transfer signal Trf(n). A charge generated in the PD 22(n) is thereby transferred to the FD 24(n) via the transfer transistor 23(n). At this time, when there is a large amount of light and a large amount of charge is accumulated in the PD 22(n), a charge remains in the PD 22(n) according to the capacitance of the FD 24(n).

After the charge is transferred to the FD 24(n), the signal of a level corresponding to a potential after the charge is transferred from the PD 22(n) to the FD 24(n) is output from the amplifying transistor 25(n), and captured by the column processing circuit 14. The column processing circuit 14 obtains a low-illuminance signal as an image signal obtained by imaging a part of low illuminance with a high gain by calculating a difference between the signal of the second reset level and the signal of the level corresponding to the potential after the charge is transferred from the PD 22(n) to the FD 24(n).

Next, the vertical driving circuit 13 turns on the connecting signal Cnt(n) again, and outputs a second transfer pulse for turning on the transfer signal Trf(n) in a state of the FD 24(n) and the FD 24(n−1) being connected to each other. The charge remaining in the PD 22(n) at the time of transfer of a charge according to the first transfer pulse is thereby transferred to the FD 24(n) and the FD 24(n−1) via the transfer transistor 23(n) in the state of the FD 24(n) and the FD 24(n−1) being connected to each other via the connecting transistor 28(n). At this time, the charge transferred to the FD 24(n) according to the first transfer pulse and the charge transferred to the FD 24(n) and the FD 24(n−1) according to the second transfer pulse are added together, and the total charge generated in the PD 22(n) is stored at the FD 24(n) and the FD 24(n−1).

The column processing circuit 14 calculates a difference between the signal of the first reset level and the signal of a level corresponding to a potential after the charge is transferred from the PD 22(n) to the FD 24(n) and the FD 24(n−1) according to the second transfer pulse. The column processing circuit 14 thereby obtains a high-illuminance signal as an image signal obtained by imaging a part of high illuminance with a low gain.

Then, when timing of ending the readout of the signal of the pixel 21(n) arrives, the vertical driving circuit 13 turns off the selecting signal Sel(n) and the connecting signal Cnt(n).

Thus, in the fifth example of driving in which the signal of the pixel 21(n) is read out, the column processing circuit 14 obtains two image signals, that is, the low-illuminance signal and the high-illuminance signal, and outputs the two image signals to the output circuit 15. For example, when the low-illuminance signal is less than a predetermined specified value, the output circuit 15 outputs the low-illuminance signal as an image signal. On the other hand, when the low-illuminance signal is equal to or more than the predetermined specified value, the output circuit 15 outputs the high-illuminance signal as an image signal.

The solid-state imaging device 11 can thereby obtain an image signal with an excellent S/N at low illuminance and with a wide dynamic range. In addition, the fifth driving example can eliminate effects of distribution noise and reset noise as described above.

Figure 8:
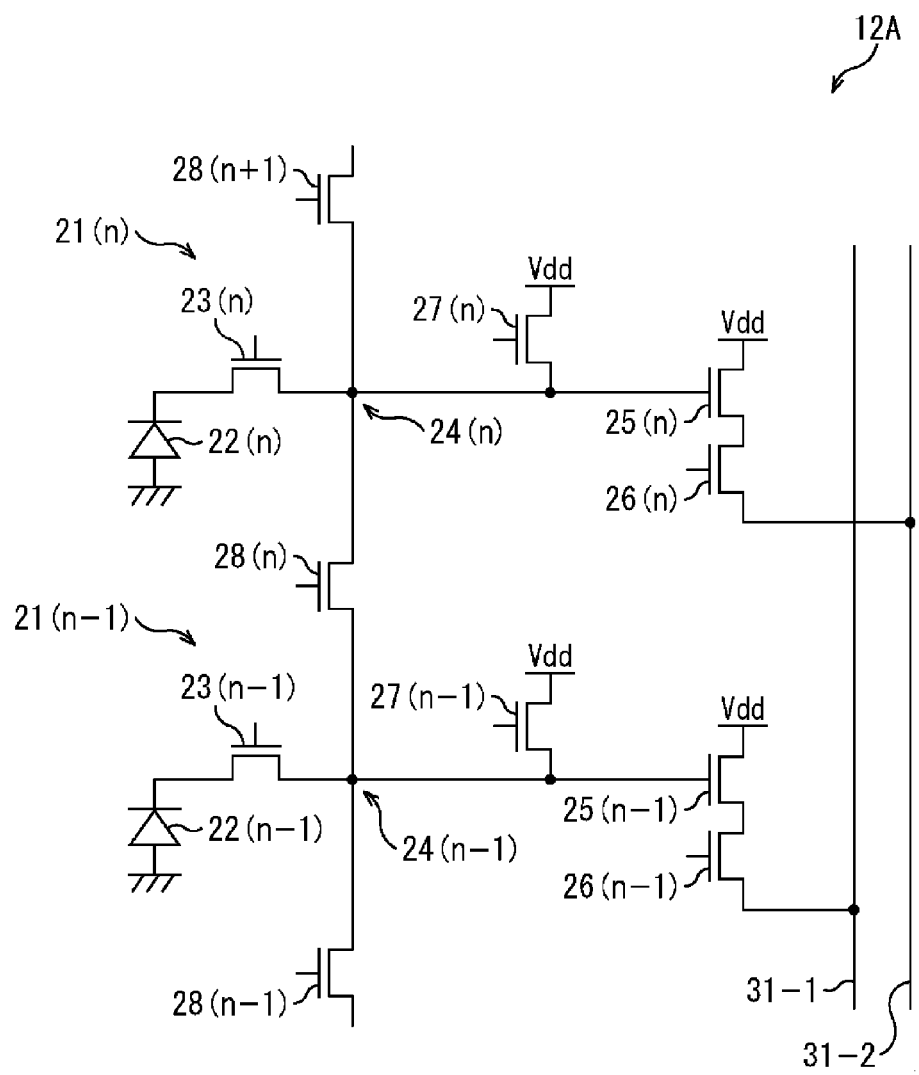
FIG. 8 is a circuit diagram showing a pixel unit as a second example of configuration.

FIG. 8 is a circuit diagram showing a pixel unit 12A as a second example of configuration of the pixel unit 12 in FIG. 1.

As shown in FIG. 8, the pixel unit 12A is different from the pixel unit 12 in FIG. 2 in that the pixel unit 12A has two vertical signal lines 31-1 and 31-2 provided for each column of pixels 21. Incidentally, a pixel 21(n) and a pixel 21(n−1) have a similar configuration to that of the pixel 21(n) and the pixel 21(n−1) in FIG. 2, and detailed description thereof will be omitted.

In the pixel unit 12A, for example, pixels 21 of even-numbered rows are connected to the vertical signal line 31-1, and pixels 21 of odd-numbered rows are connected to the vertical signal line 31-2. In the example of FIG. 8, the pixel 21(n−1) is connected to the vertical signal line 31-1, and the pixel 21(n) is connected to the vertical signal line 31-2.

Figure 9:
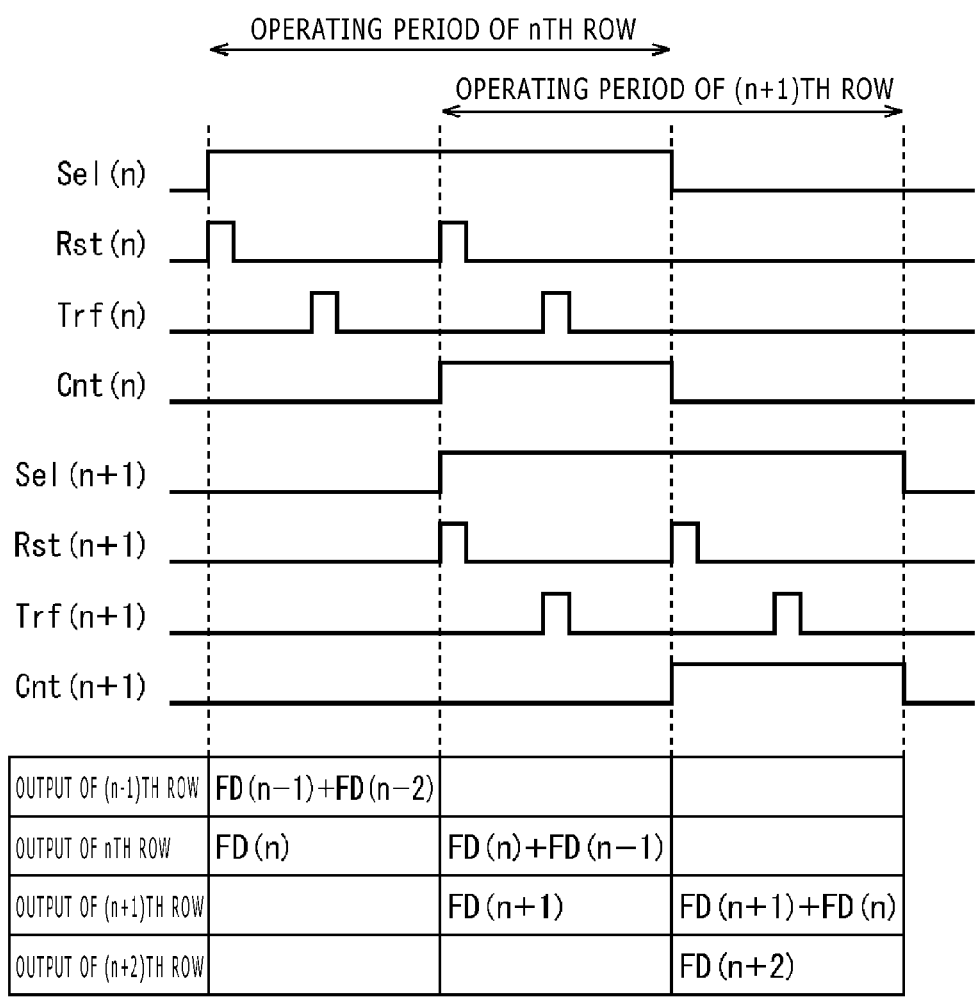
FIG. 9 is a diagram showing the driving timing of a sixth example of driving in which the signal of a pixel is read out.

A sixth example of driving in which the signal of the pixel 21(n) is read out in the solid-state imaging device 11 having the pixel unit 12A in FIG. 8 will next be described with reference to FIG. 9.

Figure 4:
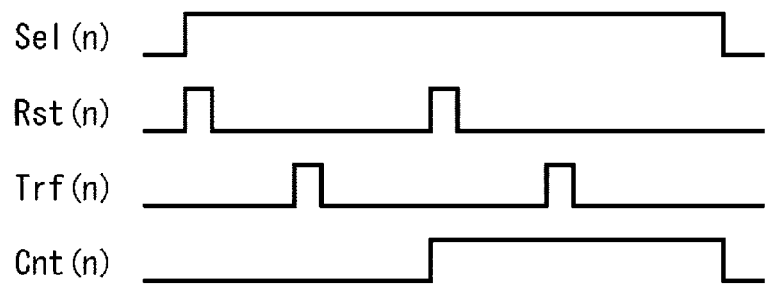
FIG. 4 is a diagram showing the driving timing of a second example of driving in which the signal of a pixel is read out.

In the sixth driving example, timing of reading out the signal of the pixel 21(n) in an even-numbered row and timing of reading out the signal of a pixel 21(n+1) in an odd-numbered row are each similar to that of the second driving example (FIG. 4). However, in the sixth driving example, half of an operating period for the timing of reading out the signal of the pixel 21(n) in the even-numbered row coincides with half of an operating period for the timing of reading out the signal of the pixel 21(n+1) in the odd-numbered row.

Specifically, in the second driving example (FIG. 4), the low-illuminance signal corresponding to the charge converted into a voltage by the capacitance of the FD 24(n) is read out in the first half of an operating period, and the high-illuminance signal corresponding to the charge converted into a voltage by the capacitance of the FD 24(n) and the FD 24(n−1) is read out in the second half of the operating period.

Thus, in the sixth driving example, for example, a low-illuminance signal corresponding to a charge converted into a voltage by the capacitance of an FD 24(n) is read out via the vertical signal line 31-2 in the first half of the operating period of the pixel 21(n) in the nth row. In parallel with this operation, a high-illuminance signal corresponding to a charge converted into a voltage by a capacitance obtained by coupling an FD 24(n−1) and an FD 24(n−2) to each other is read out via the vertical signal line 31-1 in the second half of the operating period of the pixel 21(n−1) in the (n−1)th row.

Then, a high-illuminance signal corresponding to a charge converted into a voltage by the capacitance obtained by coupling the FD 24(n) and the FD 24(n−1) to each other is read out via the vertical signal line 31-2 in the second half of the operating period of the pixel 21(n) in the nth row. In parallel with this operation, a low-illuminance signal corresponding to a charge converted into a voltage by the capacitance of an FD 24(n+1) is read out via the vertical signal line 31-1 in the first half of the operating period of the pixel 21(n+1) in the (n+1)th row.

Thereafter, a high-illuminance signal corresponding to a charge converted into a voltage by the capacitance obtained by coupling the FD 24(n+1) and the FD 24(n) to each other is read out via the vertical signal line 31-1 in the second half of the operating period of the pixel 21(n+1) in the (n+1)th row. In parallel with this operation, a low-illuminance signal corresponding to a charge converted into a voltage by the capacitance of an FD 24(n+2) is read out via the vertical signal line 31-2 in the first half of the operating period of a pixel 21(n+2) in an (n+2)th row.

Thus, in the sixth driving example in which the signal of the pixel 21(n) is read out, as in the foregoing second driving example, for example, an image signal with an excellent S/N at low illuminance and with a wide dynamic range can be obtained. Further, in the sixth driving example, the readout operations of pixels 21 in two rows are performed in parallel with each other using the two vertical signal lines 31-1 and 31-2, and thereby the readout of pixel signals can be increased in speed substantially twofold.

Figure 10:
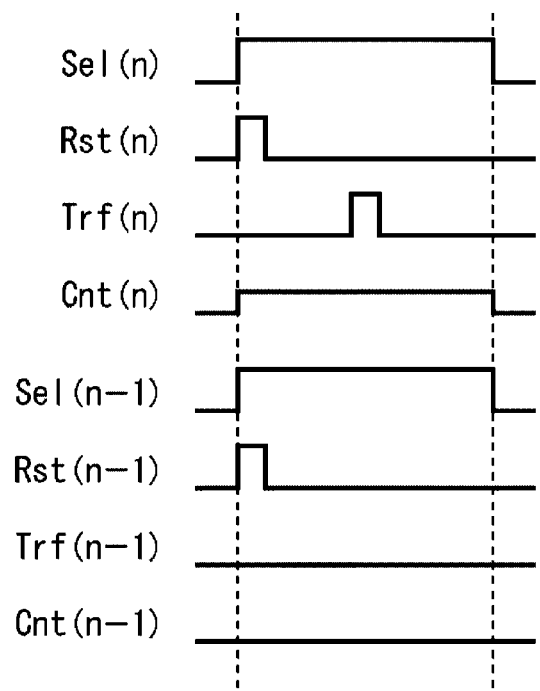
FIG. 10 is a diagram showing the driving timing of a seventh example of driving in which the signal of a pixel is read out.

A seventh example of driving in which the signal of the pixel 21(n) is read out in the solid-state imaging device 11 having the pixel unit 12A in FIG. 8 will next be described with reference to FIG. 10.

First, when timing of starting the readout of the signal of the pixel 21(n) arrives, the vertical driving circuit 13 turns on the selecting signal Sel(n) and a selecting signal Sel(n−1). The vertical driving circuit 13 further controls a connecting transistor 28(n) so as to be in a half-opened state by applying an intermediate voltage (for example 1 V) to the gate of the connecting transistor 28(n) by the connecting signal Cnt(n). The FD 24(n) and the FD 24(n−1) are thereby connected to each other with a potential barrier provided between the FD 24(n) and the FD 24(n−1).

Next, the vertical driving circuit 13 resets the FD 24(n) and the FD 24(n−1) by outputting reset pulses for turning on the reset signal Rst(n) and a reset signal Rst(n−1). After the FD 24(n) and the FD 24(n−1) are reset, the column processing circuit 14 captures the signal output to the vertical signal line 31-2 by an amplifying transistor 25(n) as the signal of the reset level of the FD 24(n). In addition, at this time, the column processing circuit 14 captures the signal output to the vertical signal line 31-1 by an amplifying transistor 25(n−1) as the signal of the reset level of the FD 24(n−1).

The vertical driving circuit 13 thereafter outputs a first transfer pulse for turning on the transfer signal Trf(n). A charge generated in a PD 22(n) is thereby transferred to the FD 24(n) via a transfer transistor 23(n). At this time, when there is a small amount of light, the charge generated in the PD 22(n) remains at only the FD 24(n). On the other hand, when there is a large amount of light and a large amount of charge is accumulated in the PD 22(n), the charge overflows the potential barrier at the connecting transistor 28(n), and overflows from the FD 24(n) into the FD 24(n−1), so that a charge is also stored at the FD 24(n−1).

After the charge from the PD 22(n) is transferred, the signal of a level corresponding to the potential of the FD 24(n) after the transfer of the charge is captured by the column processing circuit 14 via the vertical signal line 31-2. In the same timing, the signal of a level corresponding to the potential of the FD 24(n−1) after the transfer of the charge is captured by the column processing circuit 14 via the vertical signal line 31-1. The column processing circuit 14 obtains a low-illuminance signal as an image signal obtained by imaging a part of low illuminance with a high gain by calculating a difference between the signal of the reset level of the FD 24(n) and the signal of the level corresponding to the potential of the FD 24(n) after the transfer of the charge. In addition, the column processing circuit 14 obtains a high-illuminance signal as an image signal obtained by imaging a part of high illuminance with a low gain by calculating a difference between the signal of the reset level of the FD 24(n−1) and the signal of the level corresponding to the potential of the FD 24(n−1) after the transfer of the charge and adding the difference to the low-illuminance signal.

Figure 11:
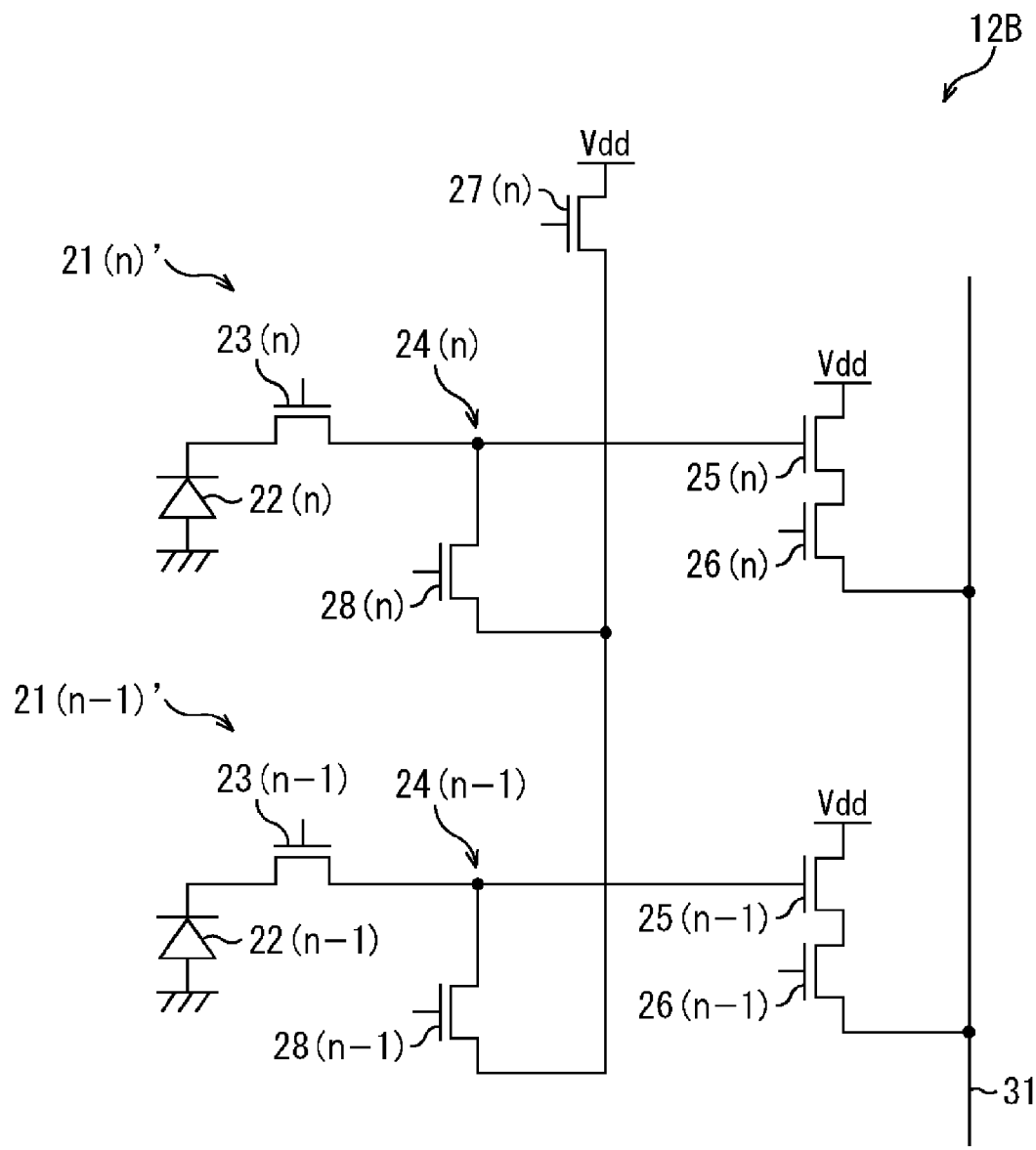
FIG. 11 is a circuit diagram showing a pixel unit as a third example of configuration.

Then, when timing of ending the readout of the signal of the pixel 21(n) arrives, the vertical driving circuit 13 turns off the selecting signal Sel(n), the selecting signal Sel(n−1), and the connecting signal Cnt(n). Thus, in the seventh driving example in which the signal of the pixel 21(n) is read out, an image signal with an excellent S/N at low illuminance and with a wide dynamic range can be obtained. Further, in the seventh driving example, the readout operations of pixels 21 are performed at the same time using the two vertical signal lines 31-1 and 31-2, and thereby the readout of pixel signals can be increased in speed substantially twofold as compared with the second driving example, for example. FIG. 11 is a circuit diagram showing a pixel unit 12B as a third example of configuration of the pixel unit 12 in FIG. 1.

In the pixel unit 12 in FIG. 1, all of the FDs 24 in one column are connected to each other via connecting transistors 28. As shown in FIG. 11, in the pixel unit 12B, FDs 24 are connected to each other via connecting transistors 28 in each unit of two pixels 21.

A pixel 21(n)' and a pixel 21(n−1)' have a configuration in which the FD 24(n) of the pixel 21(n)' and the FD 24(n−1) of the pixel 21(n−1)' are connected to each other via a connecting transistor 28(n) and a connecting transistor 28(n−1). In addition, a reset transistor 27(n) is connected to the shared node of the connecting transistor 28(n). This can reduce the number of transistors connected to the nodes of the FD 24(n) and the FD 24(n−1), and can decrease the capacitance of one FD 24(n). In addition, when the FD 24(n) and the FD 24(n−1) are connected to each other, the FD 24(n) and the FD 24(n−1) are connected via the two connecting transistors 28(n) and 28(n−1). Thereby a capacitance at the time of the connection can be increased.

Figure 12:
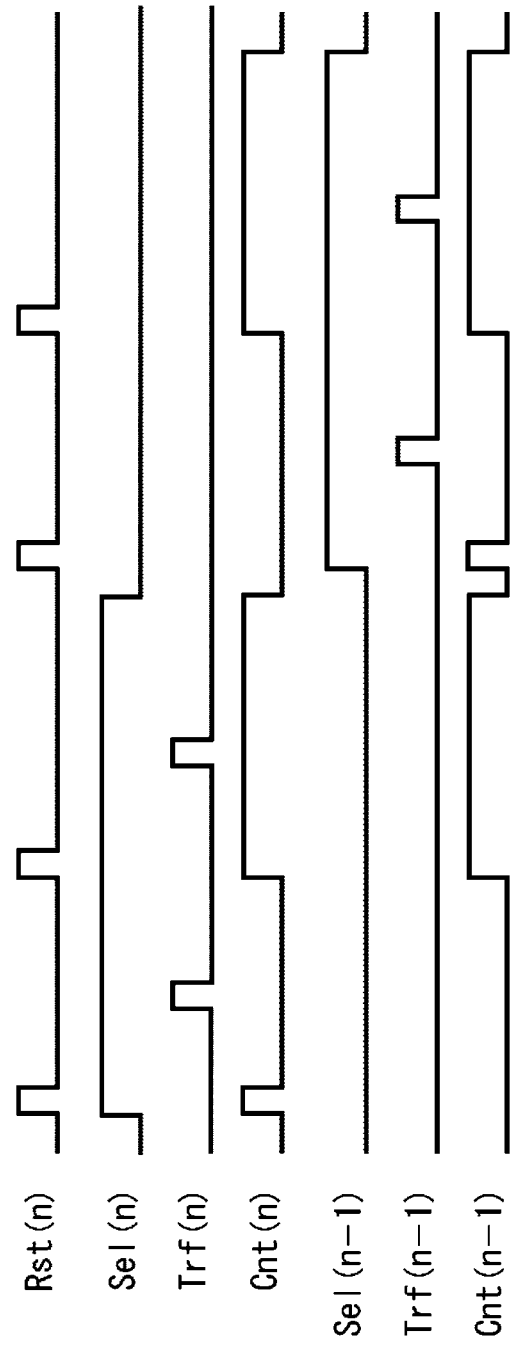
FIG. 12 is a diagram showing the driving timing of an eighth example of driving in which the signal of a pixel is read out.

An eighth example of driving in which the signals of the pixel 21(n)' and the pixel 21(n−1)' are read out in the solid-state imaging device 11 having the pixel unit 12B in FIG. 11 will next be described with reference to FIG. 12.

First, when timing of starting the readout of the signal of the pixel 21(n)' arrives, the vertical driving circuit 13 turns on the selecting signal Sel(n). Thereby, an amplifying transistor 25(n) is connected to a vertical signal line 31 via a selecting transistor 26(n), and the amplifying transistor 25(n) starts outputting a signal corresponding to the potential of the FD 24(n).

Next, the vertical driving circuit 13 resets the FD 24(n) by outputting a first reset pulse for turning on the reset signal Rst(n) and outputting a pulse for turning on the connecting signal Cnt(n). Thereafter, the column processing circuit 14 captures the signal output to the vertical signal line 31 by the amplifying transistor 25(n) as the signal of a first reset level. The signal of the first reset level indicates the reset level of the FD 24(n) in a state of not being disconnected from the FD 24(n−1).

After the column processing circuit 14 captures the signal of the first reset level, the vertical driving circuit 13 outputs a first transfer pulse for turning on the transfer signal Trf(n). A charge generated in a PD 22(n) is thereby transferred to the FD 24(n) via a transfer transistor 23(n). At this time, when there is a large amount of light and a large amount of charge is accumulated in the PD 22(n), a charge remains in the PD 22(n) according to the capacitance of the FD 24(n).

After the charge is transferred to the FD 24(n), the signal of a level corresponding to the charge transferred to the FD 24(n) at the time of the transfer of the charge according to the first transfer pulse is output from the amplifying transistor 25(n), and captured by the column processing circuit 14. The column processing circuit 14 obtains a low-illuminance signal as the image signal of the pixel 21(n)' which image signal is obtained by imaging a part of low illuminance with a high gain by calculating a difference between the signal of the first reset level and the signal of the level corresponding to the potential of the FD 24(n) after the transfer of the charge according to the first transfer pulse.

Next, the vertical driving circuit 13 turns on the connecting signal Cnt(n) and the connecting signal Cnt(n−1), and outputs a second reset pulse for turning on the reset signal Rst(n). Then, after the FD 24(n) and the FD 24(n−1) are reset in a state of being connected to each other, the column processing circuit 14 captures the signal output to the vertical signal line 31 by the amplifying transistor 25(n) as the signal of a second reset level.

The vertical driving circuit 13 thereafter outputs a second transfer pulse for turning on the transfer signal Trf(n). At this time, the charge remaining in the PD 22(n) at the time of the transfer of the charge according to the first transfer pulse is transferred to the FD 24(n) and the FD 24(n−1) via the transfer transistor 23(n). That is, when there is a large amount of light and a charge remains in the PD 22(n) at the time of the transfer of the charge according to the first transfer pulse, the charge is transferred from the PD 22(n) to the FD 24(n) and the FD 24(n−1).

The column processing circuit 14 calculates a difference between the signal of the second reset level and the signal of a level corresponding to a potential after the charge is transferred from the PD 22(n) to the FD 24(n) and the FD 24(n−1) according to the second transfer pulse. The column processing circuit 14 thereby obtains a high-illuminance signal as the image signal of the pixel 21(n)' which image signal is obtained by imaging a part of high illuminance with a low gain.

Then, when timing of ending the readout of the signal of the pixel 21(n)' arrives, the vertical driving circuit 13 turns off the selecting signal Sel(n), the connecting signal Cnt(n), and the connecting signal Cnt(n−1). Next, the readout of the signal of the pixel 21(n−1)' is started, and the vertical driving circuit 13 turns on the selecting signal Sel(n−1). Thereby, an amplifying transistor 25(n−1) is connected to the vertical signal line 31 via a selecting transistor 26(n−1), and the amplifying transistor 25(n−1) starts outputting a signal corresponding to the potential of the FD 24(n−1).

Next, the vertical driving circuit 13 resets the FD 24(n−1) by outputting a third reset pulse for turning on the reset signal Rst(n) and outputting a pulse for turning on the connecting signal Cnt(n−1). Thereafter, the column processing circuit 14 captures the signal output to the vertical signal line 31 by the amplifying transistor 25(n−1) as the signal of a third reset level. The signal of the third reset level indicates the reset level of the FD 24(n−1) in a state of not being disconnected from the FD 24(n).

After the column processing circuit 14 captures the signal of the third reset level, the vertical driving circuit 13 outputs a third transfer pulse for turning on a transfer signal Trf(n−1). A charge generated in a PD 22(n−1) is thereby transferred to the FD 24(n−1) via a transfer transistor 23(n−1). At this time, when there is a large amount of light and a large amount of charge is accumulated in the PD 22(n−1), a charge remains in the PD 22(n−1) according to the capacitance of the FD 24(n−1). After the charge is transferred to the FD 24(n−1), the signal of a level corresponding to the charge transferred to the FD 24(n−1) at the time of the transfer of the charge according to the third transfer pulse is output from the amplifying transistor 25(n−1), and captured by the column processing circuit 14. The column processing circuit 14 obtains a low-illuminance signal as the image signal of the pixel 21(n−1)' which image signal is obtained by imaging a part of low illuminance with a high gain by calculating a difference between the signal of the third reset level and the signal of the level corresponding to the potential of the FD 24(n−1) after the transfer of the charge according to the third transfer pulse.

Next, the vertical driving circuit 13 turns on the connecting signal Cnt(n) and the connecting signal Cnt(n−1), and outputs a fourth reset pulse for turning on the reset signal Rst(n). Then, after the FD 24(n) and the FD 24(n−1) are reset in a state of being connected to each other, the column processing circuit 14 captures the signal output to the vertical signal line 31 by the amplifying transistor 25(n−1) as the signal of a fourth reset level.

The vertical driving circuit 13 thereafter outputs a fourth transfer pulse for turning on the transfer signal Trf(n−1). At this time, the charge remaining in the PD 22(n−1) at the time of the transfer of the charge according to the third transfer pulse is transferred to the FD 24(n) and the FD 24(n−1) via the transfer transistor 23(n−1). That is, when there is a large amount of light and a charge remains in the PD 22(n−1) at the time of the transfer of the charge according to the third transfer pulse, the charge is transferred from the PD 22(n−1) to the FD 24(n) and the FD 24(n−1).

The column processing circuit 14 calculates a difference between the signal of the fourth reset level and the signal of a level corresponding to a potential after the charge is transferred from the PD 22(n−1) to the FD 24(n) and the FD 24(n−1) according to the fourth transfer pulse.

The column processing circuit 14 thereby obtains a high-illuminance signal as the image signal of the pixel 21(n−1)' which image signal is obtained by imaging a part of high illuminance with a low gain.

Then, when timing of ending the readout of the signal of the pixel 21(n−1)' arrives, the vertical driving circuit 13 turns off the selecting signal Sel(n−1), the connecting signal Cnt(n), and the connecting signal Cnt(n−1).

Thus, in the pixel unit 12B, pixel signals are alternately read out from the pixel 21(n)' of the nth row and the pixel 21(n−1)' of the (n+1)th row. As in the foregoing second driving example, for example, an image signal with an excellent S/N at low illuminance and with a wide dynamic range can be obtained.

In addition, in the pixel unit 12B, the number of transistors connected to the FD 24(n) can be reduced as compared with the pixel units 12 and 12A, and the capacitance of the FD 24(n) can be decreased. This makes it possible to further increase a gain at a time of conversion of a charge into a voltage by the FD 24(n), and achieve an even better S/N.

FIG. 13 is a block diagram showing an example of configuration of an imaging device included in an electronic device.

As shown in FIG. 13, the imaging device 51 includes an optical system 52, a solid-state imaging element 53, a DSP 54, a display device 55, a memory 56, a power supply system 57, an operating system 58, and a CPU (Central Processing Unit) 59. The imaging device 51 can take a still image and a moving image.

The optical system 52 includes one or a plurality of lenses. The optical system 52 guides image light (incident light) from a subject to the solid-state imaging element 53, and makes an image formed on the light receiving surface (sensor section) of the solid-state imaging element 53.

The solid-state imaging device 11 according to the example of configuration as described above is applied as the solid-state imaging element 53. A signal charge is accumulated in the solid-state imaging device 53 for a certain period according to the image formed on the light receiving surface via the optical system 52. Then, the signal charge accumulated in the solid-state imaging element 53 is transferred according to a driving signal (timing signal) supplied from the DSP 54.

The DSP 54 drives the solid-state imaging element 53 by outputting the driving signal for controlling the transfer operation of the solid-state imaging element 53. The DSP 54 also subjects the signal charge output from the solid-state imaging element 53 to various kinds of signal processing. An image (image data) obtained by the signal processing of the DSP 54 is supplied to the display device 55 having a liquid crystal panel or the like and displayed on the display device 55, or supplied to the memory 56 and stored (recorded) in the memory 56. The power supply system 57 supplies power to various parts of the imaging device 51. For example, the power supply system 57 includes a battery. The operating system 58 includes a button, a lever, a touch panel, and the like operated by a user. The CPU 59 controls various parts of the imaging device 51 according to a user operation performed on the operating system 58 to make imaging performed by the imaging device 51.

In the thus configured imaging device 51, the solid-state imaging device 11 that can obtain an image signal with an excellent S/N at low illuminance and with a wide dynamic range as described above is applied as the solid-state imaging element 53. Thereby an image of higher image quality can be obtained.

That is, the imaging device 51 can obtain an image of an excellent S/N with a high gain at low illuminance, and obtain an image with a wide dynamic range without saturation up to a large amount of light at high illuminance. In addition, an FD possessed by the solid-state imaging element 53 is not formed by a plurality of capacitances, so that a decrease in area of a PD can be avoided, and the sensitivity and amount of saturation charge of the PD can be improved. In addition, a high dielectric constant film or a stacked type capacitance is not used to improve the sensitivity of the PD, so that increases in cost which increases are expected when a high dielectric constant film and a stacked type capacitance are used can be avoided.

Incidentally, the imaging device 51 can be not only a device that performs imaging using visible light but also a device that converts a physical quantity such as X-rays, a particle flux, or the like into a charge and which detects a distribution.

Further, the solid-state imaging device 11 can employ a configuration (so-called pixel sharing) in which a plurality of pixels 21 share an FD 24 and the FDs 24 of pixels 21 in an upper row and a lower row are connected to each other via a connecting transistor 28. In addition, voltage for driving the solid-state imaging device 11 or the like can be adjusted as appropriate. In addition, driving other than publicly known driving, for example an operation of reading out a signal from a pixel 21 and resetting a PD 22 before readout from a pixel 21 in a next row, can be added.

In addition, description has been made of an example in which a charge is transferred from the PD 22 to the FD 24 twice in one signal readout operation. However, two or more times of transfer may be performed. For example, a charge may be transferred from a PD 22 to a single FD 24, four FDs 24 may next be connected to each other via connecting transistors 28 to transfer a charge to the four FDs 24, and 16 FDs 24 may be further connected to each other via connecting transistors 28 to transfer a charge to the 16 FDs 24. This can increase an amount of charge that can be handled by FDs, and further widen the dynamic range.

Incidentally, there is a fear that an imaging element disclosed in Japanese Patent Laid-Open No. 2006-41866 filed previously by the present applicant might be construed as also employing a configuration in which FDs are connected to each other as in the solid-state imaging device 11. However, this imaging element is configured such that a charge is transferred from a PD in two directions, and is thus different in concept from the solid-state imaging device 11 in which a charge is transferred from a PD in one direction. In addition, this imaging element cannot operate on the same principles as those of the solid-state imaging device 11 in that the PD is connected between FDs in the imaging element.

Incidentally, the present technology can also adopt the following constitutions.

(1) An imaging device including:
a pixel unit including a pixel disposed in a plane, the pixel including
an accumulating section configured to detect a physical quantity, and accumulate a charge corresponding to the physical quantity,
a transfer section configured to transfer the charge from the accumulating section,
a converting section configured to convert the charge transferred from the accumulating section via the transfer section into a voltage corresponding to a potential generated by the charge,
an output section configured to output a signal of the voltage converted by the converting section,
a reset section configured to reset the potential of the converting section, and
a connecting section connected to the converting section; and
a driving unit configured to output
a transfer signal for giving an instruction to transfer the charge from the accumulating section of the pixel as an object of signal readout to the converting section, and
a connecting signal for controlling connection and non-connection between the converting section of the pixel present in a row as an object of signal readout and a converting section of a pixel present in a row adjacent to the pixel present in the row as the object of signal readout;
wherein the driving unit makes the charge transferred according to the transfer signal in a state of the converting sections being connected to each other according to the connecting signal.

(2) The imaging device according to the above (1),
wherein the driving unit further outputs a selecting signal for giving an instruction to select the pixel in the row as the object of signal readout and output the signal from the output section, and
the driving unit makes the signal output according to the selecting signal in the state of the converting sections being connected to each other according to the connecting signal.

(3) The imaging device according to the above (1) or (2),
wherein after making the signal output in the state of the converting sections being connected to each other according to the connecting signal, the driving unit makes the signal output in a state of the converting sections being disconnected from each other according to the connecting signal.

(4) The imaging device according to any one of the above (1) to (3),
wherein after making the charge transferred according to the transfer signal in a state of the converting sections being disconnected from each other according to the connecting signal, and making the signal output according to the selecting signal, the driving unit makes the charge transferred according to the transfer signal in the state of the converting sections being connected to each other according to the connecting signal, and makes the signal output according to the selecting signal in the state of the converting sections being connected to each other or in the state of the converting sections being disconnected from each other.

(5) The imaging device according to the above (4),
wherein the pixel unit has a plurality of signal lines for each column of pixels, and operating periods for outputting signals in a plurality of rows partially overlap each other, so that the signals in the plurality of rows are read out in parallel with each other.

(6) The imaging device according to the above (4),
wherein the pixel unit has a plurality of signal lines for each column of pixels, and in a state of the connecting signal of a voltage allowing the charge to overflow being supplied to the connecting section, the charge is transferred from the accumulating section to a plurality of the converting sections, and signals are output from the plurality of signal lines in parallel with each other.

(7) The imaging device according to any one of the above (1) to (4),
wherein connecting sections are connected from the converting sections of a plurality of the pixels different from each other to a same node, and resetting by the reset section and connection by the connecting sections are performed via the node.

It is to be noted that embodiments of the present technology are not limited to the foregoing embodiments, but are susceptible of various changes without departing from the spirit of the present technology.

The present disclosure contains subject matter related to that disclosed in Japanese Priority Patent Application JP 2011-188993 filed in the Japan Patent Office on Aug. 31, 2011, the entire content of which is hereby incorporated by reference.

What is claimed is:

1. An imaging device, comprising:
a pixel unit including a pixel disposed in a plane, the pixel including
an accumulating section configured to detect a physical quantity, and accumulate a charge corresponding to the physical quantity,
a transfer section configured to transfer the charge from the accumulating section,
a converting section configured to convert the charge transferred from the accumulating section via the transfer section into a voltage corresponding to a potential generated by the charge,
an output section configured to output a signal of the voltage converted by the converting section,
a reset section configured to reset the potential of the converting section, and
a connecting section connected to the converting section; and
a driving unit configured to output
a transfer signal for giving an instruction to transfer the charge from the accumulating section of the pixel as an object of signal readout to the converting section, and
a connecting signal for controlling connection and non-connection between the converting section of the pixel present in a row as an object of signal readout and a converting section of a pixel present in a row adjacent to the pixel present in the row as the object of signal readout;
wherein the driving unit makes the charge transferred according to the transfer signal in a state of the converting sections being connected to each other according to the connecting signal.

2. The imaging device according to claim 1,
wherein the driving unit further outputs a selecting signal for giving an instruction to select the pixel in the row as the object of signal readout and output the signal from the output section, and
the driving unit makes the signal output according to the selecting signal in the state of the converting sections being connected to each other according to the connecting signal.

3. The imaging device according to claim 2,
wherein after making the signal output in the state of the converting sections being connected to each other according to the connecting signal, the driving unit makes the signal output in a state of the converting sections being disconnected from each other according to the connecting signal.

4. The imaging device according to claim 2,
wherein after making the charge transferred according to the transfer signal in a state of the converting sections being disconnected from each other according to the connecting signal, and making the signal output according to the selecting signal, the driving unit makes the charge transferred according to the transfer signal in the state of the converting sections being connected to each other according to the connecting signal, and makes the signal output according to the selecting signal in the state of the converting sections being connected to each other or in the state of the converting sections being disconnected from each other.

5. The imaging device according to claim 4,
wherein the pixel unit has a plurality of signal lines for each column of pixels, and operating periods for outputting signals in a plurality of rows partially overlap each other, so that the signals in the plurality of rows are read out in parallel with each other.

6. The imaging device according to claim 4,
wherein the pixel unit has a plurality of signal lines for each column of pixels, and in a state of the connecting signal of a voltage allowing the charge to overflow being supplied to the connecting section, the charge is transferred from the accumulating section to a plurality of the converting sections, and signals are output from the plurality of signal lines in parallel with each other.

7. The imaging device according to claim 1, wherein connecting sections are connected from the converting sections of a plurality of the pixels different from each other to a same node, and resetting by the reset section and connection by the connecting sections are performed via the node.

8. An imaging method of an imaging device, the imaging device including
a pixel unit including a pixel disposed in a plane, the pixel including
an accumulating section configured to detect a physical quantity, and accumulate a charge corresponding to the physical quantity,
a transfer section configured to transfer the charge from the accumulating section,
a converting section configured to convert the charge transferred from the accumulating section via the transfer section into a voltage corresponding to a potential generated by the charge,
an output section configured to output a signal of the voltage converted by the converting section,
a reset section configured to reset the potential of the converting section, and
a connecting section connected to the converting section, and
a driving unit configured to output
a transfer signal for giving an instruction to transfer the charge from the accumulating section of the pixel as an object of signal readout to the converting section, and
a connecting signal for controlling connection and non-connection between the converting section of the pixel present in a row as an object of signal readout and a converting section of a pixel present in a row adjacent to the pixel present in the row as the object of signal readout, the imaging method comprising:

the driving unit making the charge transferred according to the transfer signal in a state of the converting sections being connected to each other according to the connecting signal.

9. An electronic device comprising:

an imaging device including a pixel unit including a pixel disposed in a plane, the pixel including an accumulating section configured to detect a physical quantity, and accumulate a charge corresponding to the physical quantity, a transfer section configured to transfer the charge from the accumulating section, a converting section configured to convert the charge transferred from the accumulating section via the transfer section into a voltage corresponding to a potential generated by the charge, an output section configured to output a signal of the voltage converted by the converting section, a reset section configured to reset the potential of the converting section, and a connecting section connected to the converting section, and a driving unit configured to output a transfer signal for giving an instruction to transfer the charge from the accumulating section of the pixel as an object of signal readout to the converting section, and a connecting signal for controlling connection and non-connection between the converting section of the pixel present in a row as an object of signal readout and a converting section of a pixel present in a row adjacent to the pixel present in the row as the object of signal readout, wherein the driving unit makes the charge transferred according to the transfer signal in a state of the converting sections being connected to each other according to the connecting signal.

* * * * *